United States Patent [19]

Murata et al.

[11] 4,135,937
[45] Jan. 23, 1979

[54] HIGH DENSITY HOT PRESSED THERMAL SHOCK RESISTANT SILICON CARBIDE

[75] Inventors: Yorihiro Murata, North Tonawanda; John A. Coppola, Lewiston; Carl H. McMurtry, Youngstown, all of N.Y.

[73] Assignee: The Carborundum Company, Niagara Falls, N.Y.

[21] Appl. No.: 783,140

[22] Filed: Mar. 31, 1977

[51] Int. Cl.$^2$ .............................................. C04B 35/56
[52] U.S. Cl. ......................................... 106/44; 264/65; 106/73.4
[58] Field of Search .................. 106/44, 73.4; 264/65; 423/345

[56] References Cited

U.S. PATENT DOCUMENTS

| | | | |
|---|---|---|---|
| 3,836,673 | 9/1974 | Weaver et al. | 106/44 |
| 4,004,934 | 1/1977 | Prochazka | 106/44 |
| 4,031,178 | 6/1977 | Johnson | 106/44 |

*Primary Examiner*—Winston A. Douglas
*Assistant Examiner*—J. V. Howard
*Attorney, Agent, or Firm*—David E. Dougherty; Raymond W. Green; Michael L. Dunn

[57] ABSTRACT

A method for making a dense thermal shock resistant silicon carbide ceramic body by hot pressing a blend of silicon carbide and from about 0.2 to about 2 weight percent of aluminum diboride and the resulting body.

28 Claims, No Drawings ium carbide ceramic body which has high density, good electrical conductivity and good strength. The invention further relates to the method for manufacturing such a silicon carbide ceramic body.

HIGH DENSITY HOT PRESSED THERMAL SHOCK RESISTANT SILICON CARBIDE

BACKGROUND OF THE INVENTION (a) Field of the Invention

This invention relates to hot pressed silicon carbide and more particularly relates to a hot pressed thermal shock resistant silicon carbide ceramic body which has high density, good electrical conductivity and good strength. The invention further relates to the method for manufacturing such a silicon carbide ceramic body.

(b) History of the Prior Art

In the prior art, silicon carbide ceramic bodies are generally made by one of two processes. One of the processes is hot pressing wherein particulate silicon carbide is pressed into a mold at high temperatures and pressures to form a shaped body. The other process is pressureless sintering wherein silicon carbide is preformed at low temperatures into a shape having the general shape of the finished body. The preforming is usually accomplished by pressing silicon carbide particles together at low temperatures. Subsequent to preforming, the body is heated to an elevated temperature approximately atmospheric pressure to form a finished silicon carbide ceramic body. Hot pressing has certain advantages over pressureless sintering. In particular, hot pressing results in a silicon carbide body having generally higher densities and greater strength than the pressureless sintered silicon carbide body. Furthermore, pressureless sintering is a two-step process wherein the silicon carbide must be preformed prior to heating whereas hot pressing combines the forming and heating step in one operation.

The use of neither hot pressing nor pressureless sintering has resulted in a silicon carbide body which has a density and strength as high as is desired. In addition, the use of neither hot pressing nor pressureless sintering has resulted in a high density silicon carbide body having good thermal shock resistance.

In the prior art, it has been discovered that the density of hot pressed silicon carbide bodies could be increased by incorporating certain additives such as boron carbide and boron nitride. The densities obtained through the use of the additives however, have not been as high as the theoretical density of silicon carbide nor has the thermal shock resistance of silicon carbide bodies obtained when these additives were used, been acceptable for many applications. Boron and boron carbide have been disclosed as hot pressing additives for increasing the density of silicon carbide in U.S. Pat. No. 3,960,577 and boron nitride has been disclosed as a hot pressing additive for increasing the density of silicon carbide in U.S. Pat. No. 3,954,483.

BRIEF DESCRIPTION OF THE INVENTION

The invention is a method for making a dense thermal shock resistant silicon carbide ceramic body by hot pressing which results in obtaining a high density, high strength silicon carbide body which has improved thermal shock resistance and high electrical conductivity. The method comprises blending silicon carbide consisting essentially of particles having a particle size below about 5 microns with from about 0.2 to about 2 weight percent of aluminum dirboride and with from about 150 to 500 percent carbon by weight of aluminum diboride, and hot pressing the blend at a sufficient temperature, for a sufficient time and at a sufficient pressure to obtain a silicon carbide body having a density which is at least 99 percent of the theoretical density of solid silicon carbide.

DETAILED DESCRIPTION OF THE INVENTION

In accordance with the invention, the silicon carbide particles may be blended with the aluminum diboride additive composition and the carbon by any suitable means such as introducing a mixture of the silicon carbide, aluminum diboride and carbon into a ball mill for from about 1 to 24 hours or such as slurrying the silicon carbide, aluminum diboride and carbon into a liquid. The liquid may be removed leaving a silicon carbide, additive, carbon blend or the liquid may contribute all or part of the carbon component of the blend and become carbonized during hot pressing. The particle size of the silicon carbide utilized in the method of the invention should be below 5 microns, desirably below 3 microns and most desirably be sub micron. Similarly, the particle sizes of the aluminum diboride should be below about 10 microns, desirably be below 6 microns and most desirably be below 3 microns. In the preferred embodiment the average particle size of the aluminum diboride is sub-micron. Silicon carbide for use in accordance with the invention may be of any common crystal forms such as alpha or beta silicon carbide. The carbon which is used in the method of the invention may be in the form of free particulate carbon desirably having an average particle size below 5 microns, preferably below 3 microns and most preferably sub-micron. An example of suitable particulate carbon is graphite. The carbon, as previously mentioned, may be added in the form of any carbonizable organic substance consisting of elements selected from a group consisting of carbon, nitrogen, hydrogen and oxygen and is desirably a carbon compound which has a high ratio of carbon to the remaining elements.

Desirable carbon compounds suitable for use in accordance with the invention are carbonizable organic polymers, low molecular weight aromatic compounds and high molecular weight aromatic compounds. Examples of suitable polymers include phenol-formaldehyde and polyolefins. Examples of low molecular weight aromatic compounds include benzene, toluene, xylene, naphthalene and anthracene. Examples of high molecular weight aromatic organic compounds include aromatic condensation resins such as phenol-formaldehyde resins, aniline-formaldehyde resins, cresole-formaldehyde resins, resorcinal-formaldehyde resins, dibenzanthracene, polyphenylene and polymethylphenylene. The most preferred group of compounds when carbon is to be obtained by carbonization are the high molecular weight aromatic compounds since they yield large amounts of carbon upon carbonization.

In general, from about 0.3 to about 3 weight percent and preferably from 0.4 to about 1.0 weight percent of aluminum diboride is utilized in the blend. It has been unexpectedly found that when aluminum diboride is used as a densification additive, the resulting silicon carbide has a superior combination of properties including very high densities which can equal the theoretical density of silicon carbide, good strength, and superior thermal shock resistance. In addition, the resulting ceramic body has low electrical resistance thus making it suitable in some electrical applications. When known prior art additive compositions were utilized to obtain high density sintered silicon carbide, the foregoing superior combination of properties was not obtained. For example, when boron nitride or boron carbide is used, the densities which can be obtained are not as high as those which can be obtained when aluminum diboride is used. In addition, the use of aluminum diboride gives a thermal shock resistance to the resulting hot pressed silicon carbide body which is superior to the thermal shock resistance obtained when any known prior art additive was used. The blend is introduced into a mold and hot pressed at a sufficient pressure and temperature for a sufficient time to obtain a hot pressed silicon carbide ceramic body having a density in excess of 99 percent of the theoretical density of silicon carbide. The theoretical density of silicon carbide is 3.21 and densities in excess of 99.7 percent of theoretical can often be obtained when aluminum diboride is used as the densification additive.

Suitable pressures for the hot pressing operation generally range from about 100 kilograms per square centimeter to about 1000 kilograms per square centimeter and preferrably from about 300 kilograms per square centimeter to about 400 kilograms per square centimeter. Suitable hot pressing times range from about 10 minutes to about 1 hour and preferrably range between about 15 minutes and about 45 minutes. Desirable hot pressing temperatures are from about 1900° C. to about 2500° C. and are preferrably maintained between about 1950° C. to about 2250° C.

Desirably, to avoid oxidation products, the hot pressing is carried out in an inert atmosphere such as nitrogen, hydrogen, helium, argon or mixtures thereof. To avoid oxidation, the hot pressing may also be carried out in a vacuum which is desirably below about 1mm and more desirably below about $1 \times 10^{-3}$mm of mercury pressure absolute.

The following examples serve to illustrate the process of the invention which results in the novel hot pressed silicon carbide ceramic body. The examples are not intended to limit the invention but are merely intended to be an illustration thereof. Unless otherwise indicated all parts and percentages in the examples are by weight.

EXAMPLE 1.

0.5 percent aluminum diboride and 5 percent phenol-formaldehyde resins are blended with 94.5 percent silicon carbide in a ball mill. The silicon carbide prior to blending has an average particle size of less than 0.5 microns. The composition is blended for 1 hour and is then hot pressed at a temperature of 2100° C. and a pressure of about 350 kilograms per square centimeter for 30 minutes in a argon atmosphere. The size of the graphite mold into which the silicon carbide body is hot pressed is about 3 centimeters in diameter and the height of the finished hot pressed body is about 0.7 centimeters. The density of the finished body is found to be 3.214 grams per cc which is slightly in excess of the theoretical density of silicon carbide which is reported to be 3.21 grams per cc. The electrical resistance between the faces of the resulting silicon carbide disks is found to be 0.7 ohms and the bending strength (modulus of rupture) is found to be about 5000 kilograms per square centimeter.

EXAMPLE 2

About 14 grams of a composition comprising 95.5 weight percent silicon carbide having an average particle size of less than 0.5 microns, 0.5 weight percent of boron carbide and 4 weight percent of a phenol-formaldehyde resin having a 50 percent carbon content are blended in a ball mill for 1 hour and then introduced into a mold having a diameter of about 3 centimeters. The composition is then hot pressed at 2100° C. for 30 minutes at about 350 kilogram per square centimeter pressure in an argon atmosphere. The resulting shaped hot pressed silicon carbide body has a disk shape with a thickness or height of about 0.6 centimeters. The body is then tested for thermal shock resistance by heating the body to various temperatures and quenching the body in water having a temperature of about 40° C. The results are shown in Table 1.

EXAMPLES 3 through 5

The procedure of Example 2 is followed except the additives are 1 percent boron phosphide, 1 percent boron nitride and 0.5 percent aluminum diboride respectively. The results are shown in Table 1.

TABLE 1

| Ex. | Additive | TEMPERATURE° C | | | | | | | | | | |
|---|---|---|---|---|---|---|---|---|---|---|---|---|
| | | 200° | 300° | 400° | 500° | 600° | 700° | 800° | 900° | 1000° | 1100° | 1200° |
| 2. | 0.5% B$_4$c | E | E | S | G | S | F | | | | | |
| 3. | 1.0% BP | E | E | G | G | G | G | S | F | | | |
| 4. | 1.0% BN | E | E | G | G | G | G | S | S/F | F | | |
| 5. | 0.5% AlB$_2$ | E | E | E | G | G | G | G | G | G | G | S |

E Excellent - no cracks
G Good - hairline crack visible under magnification or slight edge chip
S Satisfactory - hairline cracks visible or small edge chip
F Failure - large visible crack

What is claimed:

1. A dense thermal shock resistant silicon carbide ceramic body which comprises a hot pressed composition comprising silicon carbide, from about 0.2 to about 2.0 weight percent of aluminum diboride and from about 150 to about 500 percent of carbon by weight of aluminum diboride.

2. The body claimed in claim 1 wherein said carbon is added in the form of an organic composition prior to said hot pressing.

3. The body claimed in claim 1 wherein said silicon carbide, prior to hot pressing, consists essentially of sub micron silicon carbide particles.

4. A method for making a dense thermal shock resistant silicon carbide ceramic body which comprises:
 (a) blending silicon carbide consisting essentially of particles having a particle size below about 5 microns with from about 0.2 to about 2 weight percent of particulate aluminum diboride having an average particle size below about ten microns and with from about 150 to 500 percent carbon by weight of aluminum diboride; and
 (b) hot pressing the blend at a sufficient temperature for a sufficient time and at a sufficient pressure to obtain a silicon carbide body having a density which is at least 99 percent of the theoretical density of solid silicon carbide.

5. The method of claim 4 wherein said silicon carbide particles have an average particle size smaller than about 3 microns.

6. The method of claim 5 wherein said silicon carbide consists essentially of sub micron size particles.

7. The method of claim 4 wherein said aluminum diboride consists essentially of particles having a size smaller than about 6 microns.

8. The method of claim 7 wherein said aluminum diboride consists essentially of particles having a size smaller than about 3 microns.

9. The method of claim 4 wherein the density is at least 99.7 percent of the theoretical density of silicon carbide.

10. The method of claim 4 wherein said sufficient pressure is from about 100 to about 1000 kilograms per square centimeter.

11. The method of claim 10 wherein said sufficient temperature is from about 1900° to about 2500° C.

12. The method of claim 11 wherein said sufficient time is from about 10 minutes to about 1 hour.

13. The method of claim 12 wherein said temperature is from about 1950° C. to about 2250° C.

14. The method of claim 13 wherein said sufficient pressure is between about 300 and about 400 kilograms per square centimeter.

15. The method of claim 14 wherein said sufficient time is between about 15 and about 45 minutes.

16. The method of claim 12 wherein the silicon carbide, aluminum diboride and carbon are blended in a ball mill.

17. The method of claim 12 wherein the hot pressing is carried out in an inert atmosphere or in a vacuum.

18. The method of claim 17 wherein the inert atmosphere comprises a gas selected from the group consisting of argon, nitrogen, hydrogen, helium and mixtures thereof.

19. The method of claim 18 wherein said gas is argon.

20. The method of claim 18 wherein said gas is nitrogen.

21. The method of claim 4 wherein said carbon is added as particulate carbon having an average particle size of less than 5 microns.

22. The method of claim 21 wherein said particulate carbon has an average particle size of less than 3 microns.

23. The method of claim 21 wherein said particulate carbon consists essentially of sub micron size particles.

24. The method of claim 1 wherein said carbon is added as a carbon compound consisting of elements selected from the group consisting of carbon, nitrogen, hydrogen and oxygen.

25. The method of claim 24 wherein the carbon compound is a high molecular weight aromatic compound.

26. The method of claim 24 wherein the carbon compound is an organic polymer.

27. The method of claim 26 wherein the carbon compound is a phenol-formaldehyde resin.

28. The method of claim 12 wherein from about 0.4 to about 1.0 weight percent of aluminum diboride is used.

* * * * *